United States Patent
Eschbach et al.

(10) Patent No.: US 7,466,873 B2
(45) Date of Patent: Dec. 16, 2008

(54) ARTIFACT REMOVAL AND QUALITY ASSURANCE SYSTEM AND METHOD FOR SCANNED IMAGES

(75) Inventors: Reiner Eschbach, Webster, NY (US); Zhigang Fan, Webster, NY (US); William A. Fuss, Rochester, NY (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 453 days.

(21) Appl. No.: 11/170,013

(22) Filed: Jun. 29, 2005

(65) Prior Publication Data

US 2007/0003157 A1   Jan. 4, 2007

(51) Int. Cl.
G06K 9/40 (2006.01)
G06K 9/00 (2006.01)
G06K 9/38 (2006.01)

(52) U.S. Cl. .................. 382/275; 382/112; 382/175; 382/180

(58) Field of Classification Search .............. 382/112, 382/164, 173, 174, 175, 176, 177, 178, 179, 382/180, 275, 319
See application file for complete search history.

(56) References Cited

U.S. PATENT DOCUMENTS

| | | | |
|---|---|---|---|
| 5,422,743 A * | 6/1995 | Farrell et al. | 358/537 |
| 5,596,346 A * | 1/1997 | Leone et al. | 345/667 |
| 6,160,923 A * | 12/2000 | Lawton et al. | 382/275 |
| 6,298,151 B1 | 10/2001 | Jodoin et al. | |
| 6,373,981 B1 | 4/2002 | de Queiroz et al. | |
| 6,389,163 B1 | 5/2002 | Jodoin et al. | |
| 6,400,844 B1 | 6/2002 | Fan et al. | |
| 6,549,658 B1 | 4/2003 | Schweid et al. | |
| 6,594,401 B1 | 7/2003 | Metcalfe et al. | |
| 6,617,862 B1 * | 9/2003 | Bruce | 324/752 |
| 6,782,129 B1 | 8/2004 | Li et al. | |
| 6,832,007 B1 | 12/2004 | Zhang et al. | |
| 6,859,204 B2 | 2/2005 | Curry et al. | |
| 7,050,650 B2 * | 5/2006 | Maurer et al. | 382/275 |
| 7,277,595 B1 * | 10/2007 | Reid | 382/275 |
| 7,289,683 B2 * | 10/2007 | Trudeau | 382/274 |
| 7,382,919 B2 * | 6/2008 | Eschbach et al. | 382/173 |
| 2003/0068093 A1 * | 4/2003 | Baggs | 382/261 |
| 2003/0152277 A1 * | 8/2003 | Hall et al. | 382/229 |
| 2004/0096122 A1 | 5/2004 | Curry et al. | |
| 2005/0111731 A1 | 5/2005 | Bai et al. | |

* cited by examiner

Primary Examiner—Samir A. Ahmed
Assistant Examiner—Michael A Newman
(74) Attorney, Agent, or Firm—Fay Sharpe LLP

(57) ABSTRACT

An artifact removal and quality assurance method and system for digital images, wherein a document comprising at least one printed page is scanned or the original image data are otherwise input. The input digital image data are segmented into components as to content type. The components are classified as either information or noise components. An information component image defined by the information components and a noise component image defined by the noise components are generated and displayed to the user. The user inputs quality assurance input data to indicate zero or more improperly classified components and any improperly classified component is reclassified. The component images are then regenerated and displayed to account for the reclassified component(s). The reclassified component is moved as a unit in real time as viewed by the user from an original location in one of the component images to a corresponding location in the other of the component images. Both component images are saved or otherwise output as desired.

4 Claims, 7 Drawing Sheets

ARTIFACT REMOVAL AND QUALITY ASSURANCE SYSTEM AND METHOD FOR SCANNED IMAGES

BACKGROUND

Images derived from scanned documents often include artifacts such as streaks, blotches resulting from defects in the original document such as punch-holes, tears, stains etc. and/or resulting from scanner defects, debris, and the like. For a small scan job, these artifacts can be removed in a manual digital image enhancement operation on a pixel-by-pixel basis using widely available image processing software having an "erase" feature. This manual pixel-by-pixel based artifact removal method is not realistic in terms of time and cost for large, multi-page scan jobs commonly encountered in commercial, legal, academic, and other real-world environments.

Automated artifact removal methods have been proposed but have not been found to be satisfactory in terms of quality assurance. In these automated systems, the streaks, blotches and other artifacts are identified using known image processing techniques and are automatically deleted from the scanned image data, with appropriate adjustment of the pixel values to blend in with the surrounding pixels as needed. Such methods are suboptimal for certain applications where accuracy and quality assurance are required. These known conventional methods have not provided a convenient method for correcting errors resulting from the automated artifact removal operation. In particular, these methods can result in: (i) original image information being erroneously identified as an artifact and deleted; and, (ii) original image artifacts being erroneously identified as information and maintained in the data. These system have not provided a quality assurance method that allows a user to correct such errors easily. Also, known systems do not preserve the removed artifacts for authentication purposes and/or reversal of the artifact removal process, if needed.

In light of the deficiencies associated with known artifact removal methods, an artifact removal and quality assurance system and method for scanned images are presented herein.

SUMMARY

In accordance with the present development, an artifact removal and quality assurance method for digital images includes: scanning a document comprising a printed page; deriving input digital image data that define the page in terms of a plurality of input pixels; segmenting the input digital image data into a plurality of discrete components each defined by a group of one or more input pixels that are spatially grouped together and that relate to a common content type of the input digital image data; classifying each discrete component as either an information component or a noise component; generating and displaying to a user an information component image defined by the information components; generating and displaying to the user a noise component image defined by the noise components; receiving quality assurance input data from the user that indicates zero or more improperly classified components based upon the user's visual inspection of the information component image and the noise component image; if the quality assurance input data indicate at least one improperly classified component: (i) reclassifying the improperly classified component selected by the user; and, (ii) regenerating and displaying the information component image and the noise component image based upon the quality assurance input data to account for the at least one reclassified component so that the at least one reclassified component is moved as a unit in real time as viewed by the user from an original location in one of the component images to a corresponding location in the other of the component images.

In accordance with another aspect of the development, an artifact removal and quality assurance system for digital images includes: a scanner for scanning a document comprising at least one printed page and for deriving input digital image data that define the page in terms of a plurality of input pixels; an image processing unit for: (i) segmenting the input digital image data into a plurality of discrete components each defined by a group of one or more input pixels that are spatially grouped together and that respectively relate to common content types of the input digital image data; (ii) classifying each discrete component as either an information component or a noise component; (iii) generating and displaying to a user an information component image defined by the information components; (iv) generating and displaying to the user a noise component image defined by the noise components; an input device operably connected to the image processing unit and adapted to receive quality assurance input data from the user and provide the quality assurance data to the image processing unit, the quality assurance data indicating zero or more improperly classified components based upon the user's visual inspection of the information component image and the noise component image, wherein the image processing unit is further configured to: (i) reclassify any improperly classified component based on the quality assurance input data; and, (ii) regenerate and display the information component image and the noise component image based upon the quality assurance input data to account for the at least one reclassified component so that the reclassified component is moved as a unit in real time as viewed by the user from an original location in one of the component images to a corresponding location in the other of the component images.

In accordance with another aspect of the present development, a digital image processing system includes: an image data input device, a user input device, a visual display device, and an image processing unit. The image processing unit is adapted to: receive input image data from the image data input device and segment the input image data into a plurality of connected components each defined by a group of one or more input pixels that are spatially associated and are related to each other in terms of image content type represented thereby; classify each connected component as either an information component or a noise component and associate a confidence score with each component; perform a quality assurance operation only if the confidence score for any one component indicates a need for a quality assurance operation, wherein the quality assurance operation includes: (i) generating and displaying to a user on the visual display device an information component image defined by the information components; (ii) generating and displaying to the user on the visual display device a noise component image defined by the noise components; (iii) receiving quality assurance input data from the user via said user input device that indicates any improperly classified component based upon the user's visual inspection of the information component image and the noise component image; (iv) reclassifying any improperly classified component from a noise component to an information component or from an information component to a noise component based on said user input; (v) regenerating and displaying the information component image and the noise component image on the visual display device based upon the quality assurance data input by the user to account for any reclassified component so that any reclassified component is moved from an original location in one of the component images to a corresponding location in the other of the component images.

BRIEF DESCRIPTION OF DRAWINGS

The development comprises various components and arrangements of components, and various steps and arrangements of steps, preferred embodiments of which are disclosed herein with reference to the accompanying drawings, wherein.

DETAILED DESCRIPTION

Figure 1:
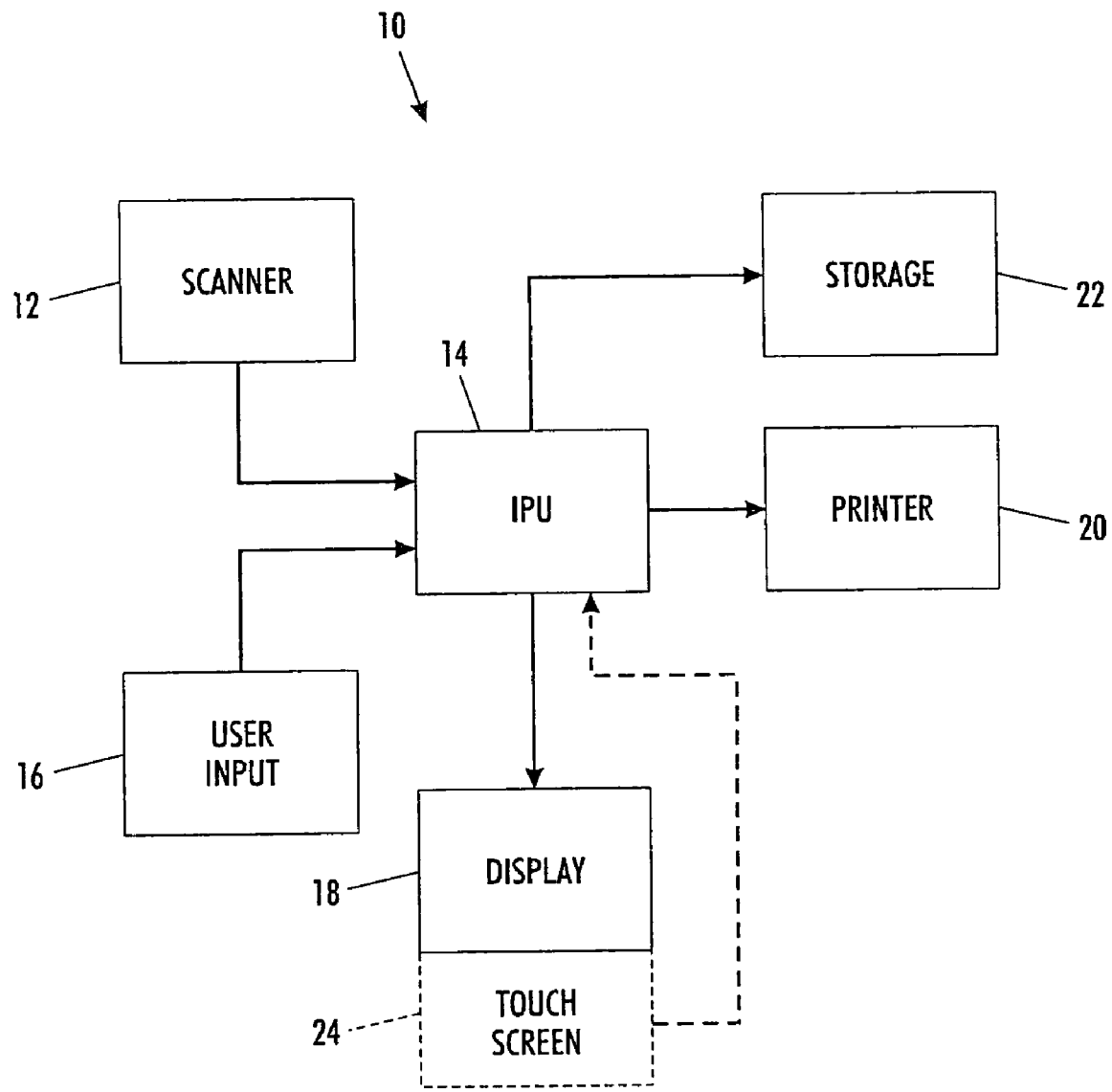
FIG. 1 illustrates a digital image processing system in accordance with the present development and suitable for implementation of an artifact removal and quality assurance system and method for scanned images in accordance with the present development.

FIG. 1 illustrates a digital image processing apparatus 10 formed in accordance with the present development. The image processing apparatus 10 can be embodied in a personal/office computing system or an image processing system such as a scanning/copying system such as a digital copier or a multifunction (scan/print/fax/copy) digital image processing system or the like. More particularly, the image processing system 10 includes a scanner 12 for receiving one or more printed document pages as input and deriving digital data that represent the printed document page as output. The system 10 further includes an image processing unit (IPU) 14 for performing digital image processing operations in accordance with the present development, i.e., for receiving input digital image data and for processing the data to derive enhanced or otherwise altered digital image data as output in accordance with stored algorithms and/or based on user-selected functions. The system 10 further comprises one or more user input devices 16, e.g., a mouse or other pointing device, a keyboard, stylus, etc., that is operatively connected to the IPU 14 and that allows a user to input data to the image processing unit 14 to control the image processing operations and all other functions of the system 10. The system further comprises one or more output devices that are operatively connected to the IPU including a visual display 18, a printer 20, and/or a mass storage device 22 such as a disk drive or the like. It should be noted that the visual display 18 can comprise a touch-screen input device 24 for user input to the IPU by using a finger or a stylus or the like to select an object displayed on the video screen of the visual display. In the most general terms, a page of a document having one or more printed pages is processed by the scanner 12 to derive digital image data that represent the printed page in terms of a plurality of pixels arranged in rows and columns, the digital image data are input from the scanner to the IPU 14 and are output from the IPU, in original or processed form based upon stored image processing algorithms, image processing circuitry, and/or user input from the input device(s) 16,24, to one or more of the output devices such as the visual display 18 for viewing, the printer 20 for generation of a new printed document and/or the mass storage device 22 for saving the data. In one embodiment, the system 10 is provided by a personal computer system programmed to perform digital image processing operations. In another embodiment, the system 10 is a dedicated digital image processing system such as a XEROX DocuTech or DocuColor image printing/reproduction system or the like. The scanner 12 can be replaced by another device such as storage device, camera or the like that supplies input image data to the image processing unit.

Figure 2:
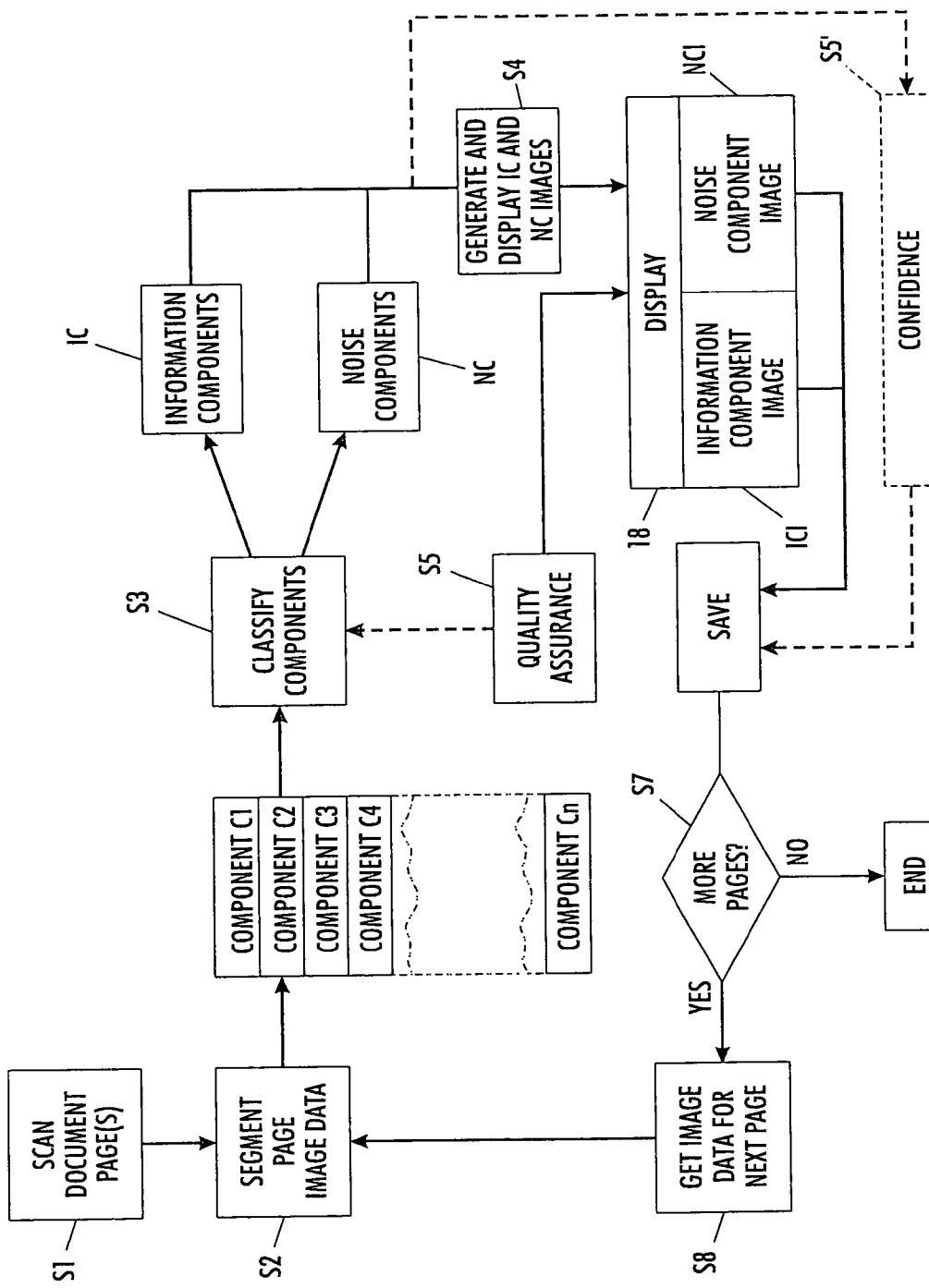
FIG. 2 is a diagrammatic illustration of an artifact removal and quality assurance method for scanned images in accordance with the present development.

FIG. 2 is a diagrammatic illustration of an artifact removal and quality assurance method for scanned images in accordance with the present development that can be implemented using the system of FIG. 1. In a step S1, a printed document page is scanned and the original digital image data defining each pixel are derived and input to the IPU. In a step S2, carried out in the image processing unit (IPU), the image data representing the document page are segmented into a plurality of discrete connected components C1, C2, . . . , Cn, wherein spatially neighboring pixels (i.e., pixels in a defined group) having similar properties and that relate to common features of the input image data are grouped together into discrete image portions or segments or components such as text components, graphics components, photographic components, line art components, etc. This grouping can be augmented by additional classifications along data vs noise, and/or image vs. artifact, etc. Also it is understood that the grouping of neighboring pixels comprehends sub-components and their spatial arrangement, as is common for graphics, text, etc. This automated segmentation operation can be carried out using any of a wide variety of segmentation algorithms as are generally known in the art, e.g., using a mixed raster content (MRC) method, wherein digital image representations of composite documents, i.e., documents having pages with mixed content including text, graphics, photographs, line art, etc., are segmented into discrete portions based on content type, but maintained in the same overall file. Alternatively, the components, can be maintained in more than one data file, with a clear association between the individual files.

After the image data representing the document page are segmented in step S2, a step S3 is carried out in the IPU to classify each segmented component C1-Cn automatically as an information component IC or a noise component NC. This classification operation is carried out using known algorithms that can identify common noise components found in digital images such as streaks, blobs/blotches, stains, and other non-information components. It should be noted that the definition of "noise" varies from application to application and that classification is thus application dependent.

Examples of Suitable methods for segmenting and classifying digital image are disclosed in the following commonly owned U.S. patents and published patent application documents, and the disclosures of these documents are hereby expressly incorporated by reference into this specification: U.S. Pat. No. 6,782,129 (Li et al.); U.S. Pat. No. 6,389,163 (Jodoin et al.); U.S. Pat. No. 6,298,151 (Jodoin et al.); U.S. Published Application No. 2005/0111731 (Bai et al.); U.S.

Pat. No. 6,832,007 (Zhang et al.); U.S. Pat. No. 6,400,844 (Fan et al.); U.S. Pat. No. 6,859,204 (Curry et al.); U.S. Published Application No. 2004/0096122 (Curry et al.); U.S. Pat. No. 6,594,401 (Metcalfe et al.); U.S. Pat. No. 6,373,981 (de Queiroz et al.); U.S. Pat. No. 6,549,658 (Schweid et al.). Co-pending application Ser. No. 10/993,852 to Wang et al. filed Nov. 19, 2004 entitled "Method for Run-Time Streak Removal" and Ser. No. 10/845,164 to Schweid et al. filed May 14, 2004 entitled "Systems and Methods for Streak Detection in Image Array Scanning Using Overdetermined Scanners and Column Filtering" relate to streak detection/removal and the disclosures of these two applications are also hereby expressly incorporated by reference into this specification.

In a step S4, the IPU generates two separate digital images for each scanned document page: (i) an information component image ICI defined by and including only information components IC; and, (ii) a noise component image NCI defined by and including only noise components NC. It should be noted that the information and noise components IC,NC are preferably displayed in their respective images ICI,NCI in the exact same relative spatial location as in the original image data. In the step S4, the IPU also displays both of these images on the display 18, preferably simultaneously side-by-side so that a user can simultaneously view and compare the two images ICI,NCI.

In a step S5, the user performs a manual quality assurance operation to correct any classification errors made in step S3. Specifically, the user views the displayed information component image ICI and noise component image NCI for each scanned document page on the display 18, preferably simultaneously side-by-side, and uses the user input device(s) 16,24 such as a mouse, stylus, touch screen to move information components IC, erroneously assigned to the noise component image NCI to the information component image ICI and to move noise components NC erroneously assigned to the information component image ICI to the noise component image NCI. Preferably, the user uses the mouse, touch screen, stylus, or the like 16,24 to "click-on" or select the noise or information component to be moved, at which time the component is moved automatically from the information component image ICI to the exact same position in the noise component image NCI or vice versa, taking the place of any fill/blend pixels in the destination image. It is important to note that any object or component is thus identified and transferred with a single "click" or similar operation. Also, it is evident that in case of documents objects often are separated by background or "white" space. In cases where the segmentation indicates a spatial separation between different objects, the object selection mechanism might preferably be extended to include pixels near to the object, thus making selection on a coarse screen, e.g. touch screen, more easily achieved. Alternatively, the user can use the input devices 16,24 to select and drag the erroneously located component IC,NC onto the proper image, and the dragged component will be automatically located in its proper position by the IPU once dragged to the other image ICI,NCI. As such, the simultaneous display of the component images ICI,NCI provides a graphical user interface (GUI). The GUI as presented visually on the display device 18 further comprises a selectable NEXT/DONE button B (FIGS. 5 and 6) that is selected by the user if no quality assurance reclassifications are required or when all quality assurance reclassifications are completed in order to move processing forward to the next step.

Figure 3:
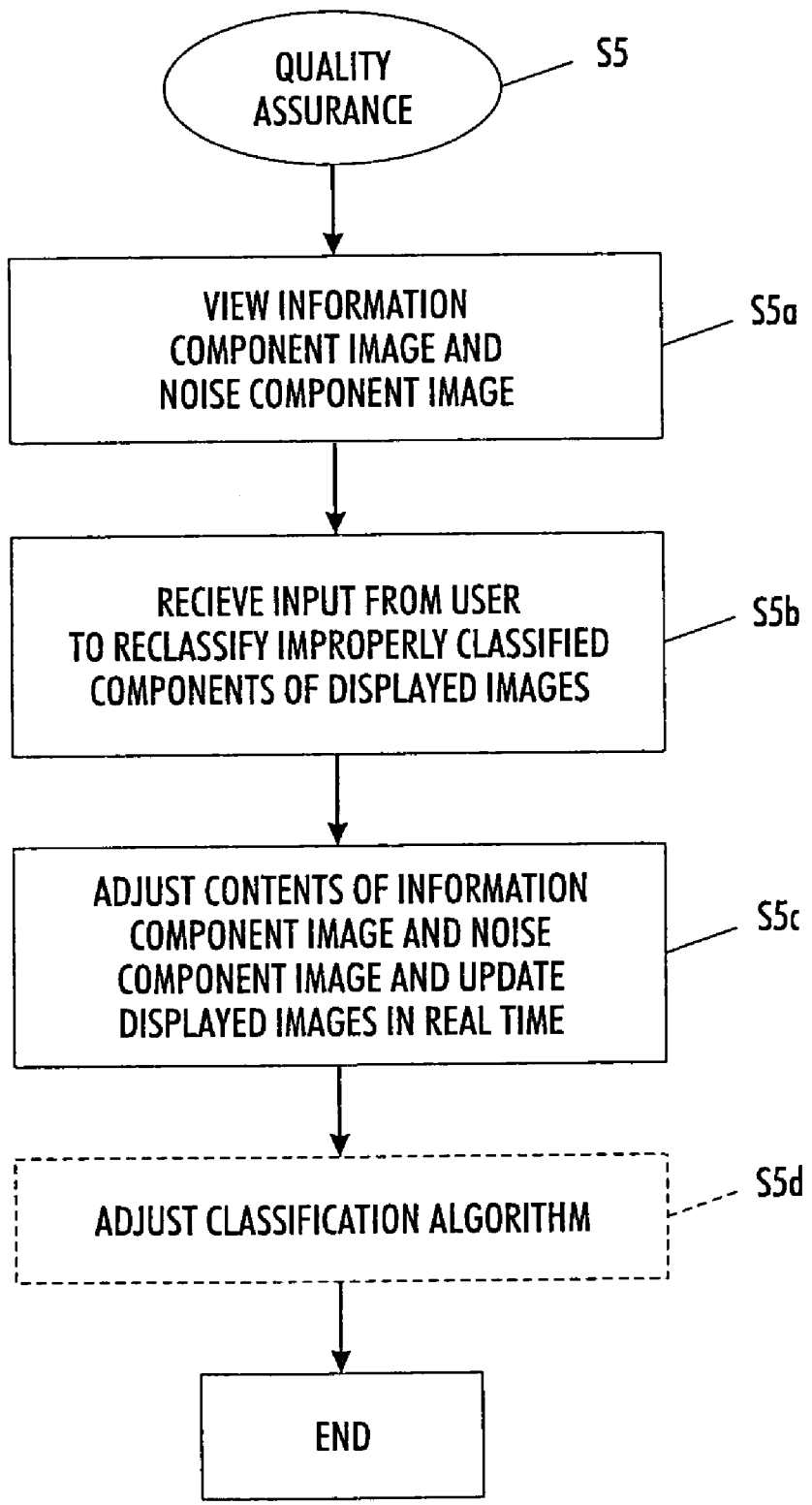
FIG. 3 is a flow chart that discloses a quality assurance method in accordance with the present development.

This quality assurance operation S5 is disclosed further with reference to FIG. 3. In a step S5a the information component image ICI and noise component image NCI are viewed simultaneously by the user on the display 18. In a step S5b, the user provides input to the IPU as to any noise component erroneously classified as information and/or any information component erroneously classified as noise. This user input is preferably provided by way of the graphical user interface (GUI) defined by the simultaneous display of the component images ICI,NCI. In a step S5c, the information components image ICI and noise components image NCI are updated by the IPU in accordance with the user input, and the updated images ICI,NCI are output to the display for viewing by the user in real time. In an optional step S5d (also indicated by a broken line arrow in FIG. 2 extending from step S5 to step S3), the user input received in step S5b is input to the IPU and, specifically input to the classification step S3, so that erroneously classified noise/information components that are also present in later-processed digital images representing additional pages of the scanned document are correctly classified during later classification operations, to provide a learning or adaptive capability to the method of the present development. For example, if a corporate seal found on some or all pages of a scanned document is classified as a stain or other noise and consequently placed in the noise component image NCI, and if by the quality assurance operation S5 (specifically the step S5b) the user reclassifies the corporate seal component as an information component IC for one or some other select threshold number of pages, the IPU updates the classification algorithm used in the classification step S3 so that as the input image data representing additional document pages are processed, the corporate seal will be classified properly as an information component IC and not as a noise component NC. In preferred example, the threshold for this optional adaptive feature is set to three, i.e, if an image component is erroneously classified by the step S3 and corrected by the user in the quality assurance step S5 for three separate pages of the scanned document, that image component will be classified correctly, i.e., as reclassified by the user in the quality assurance operation S5, for all remaining pages of the document including that component without further input from the user. As noted, a quality assurance operation S5 is completed by the user when the user selects the NEXT/DONE button B of the GUI with the input device 16,24.

Referring again to FIG. 2, the updated information component image ICI and noise component image NCI generated through the quality assurance operation S5 are saved to the storage device 22 or other location in a step S6. It is important to note that the noise component image NCI is saved in association with the information component image ICI and is not discarded. This has several advantages including allowing some or all of the noise components NC thereof to be reinserted into the information component image ICI to undo some or all of the segmentation and classifications operations. In the case where all noise components NC of the image data representing the document page are reinserted into the information component image ICI for that document page, i.e., when the information component image ICI and noise component image NCI are merged, the resulting image data once again correspond to the original image data as input from the scanner or other source and once again define the document page in its original form. Also, for authentication purposes and the like, the saved noise component image NCI associated with each information component image ICI provides a complete record of all noise components NC removed from the original image data representing a particular page of the scanned document. Again, all data might be stored in one data file, or in a grouping of associated files.

A step S7 determines if an additional pages of the scanned document remain to be processed and, if so, a step S8 is carried out to get the original image data for the next page, and control then returns to step S2 so that the original image data representing the next document page can be segmented and further processed as described above.

Figure 4:
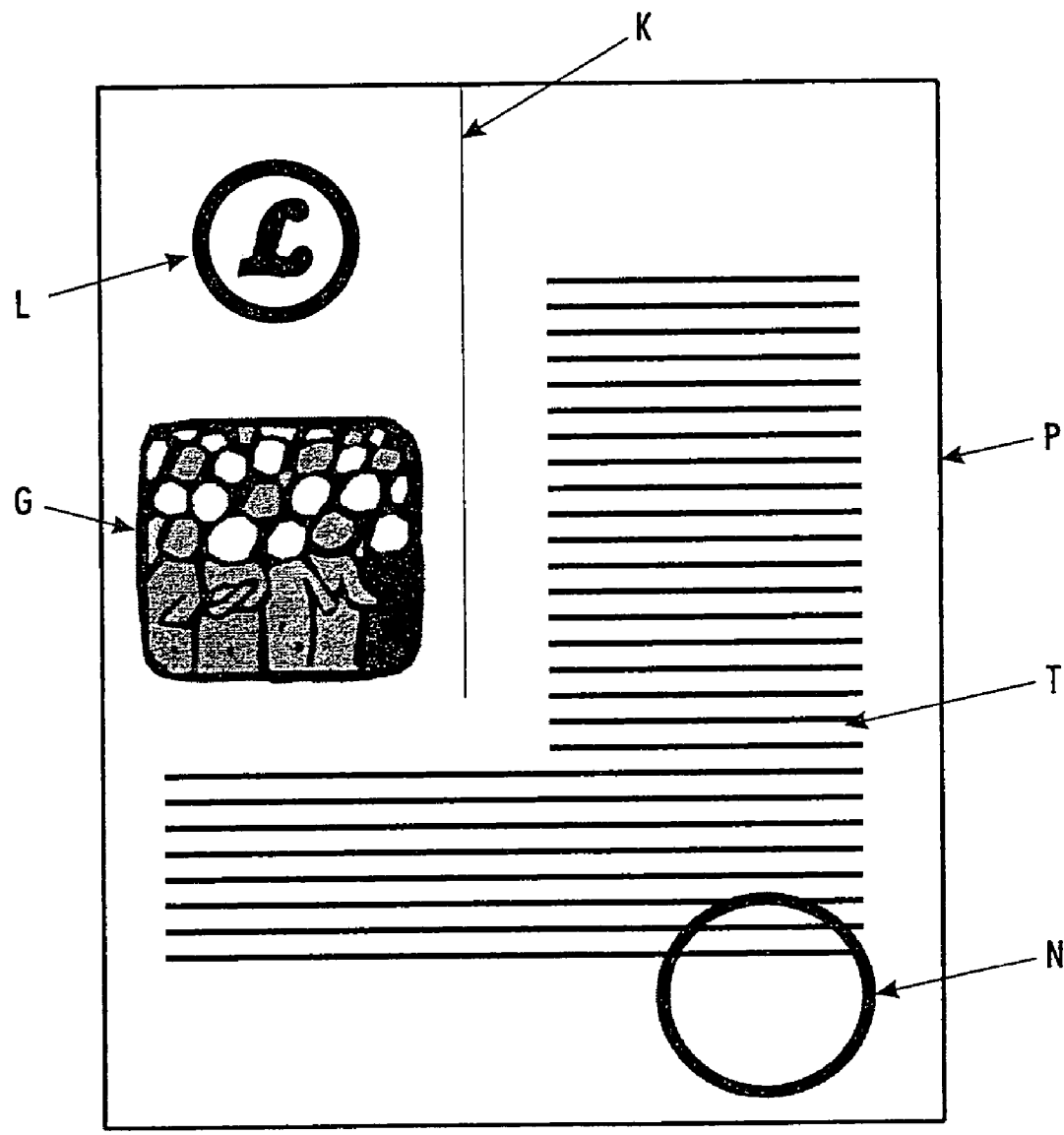
FIG. 4 is a diagrammatic illustration of a printed page of a document to be processed in accordance with the present development.
Figure 5:
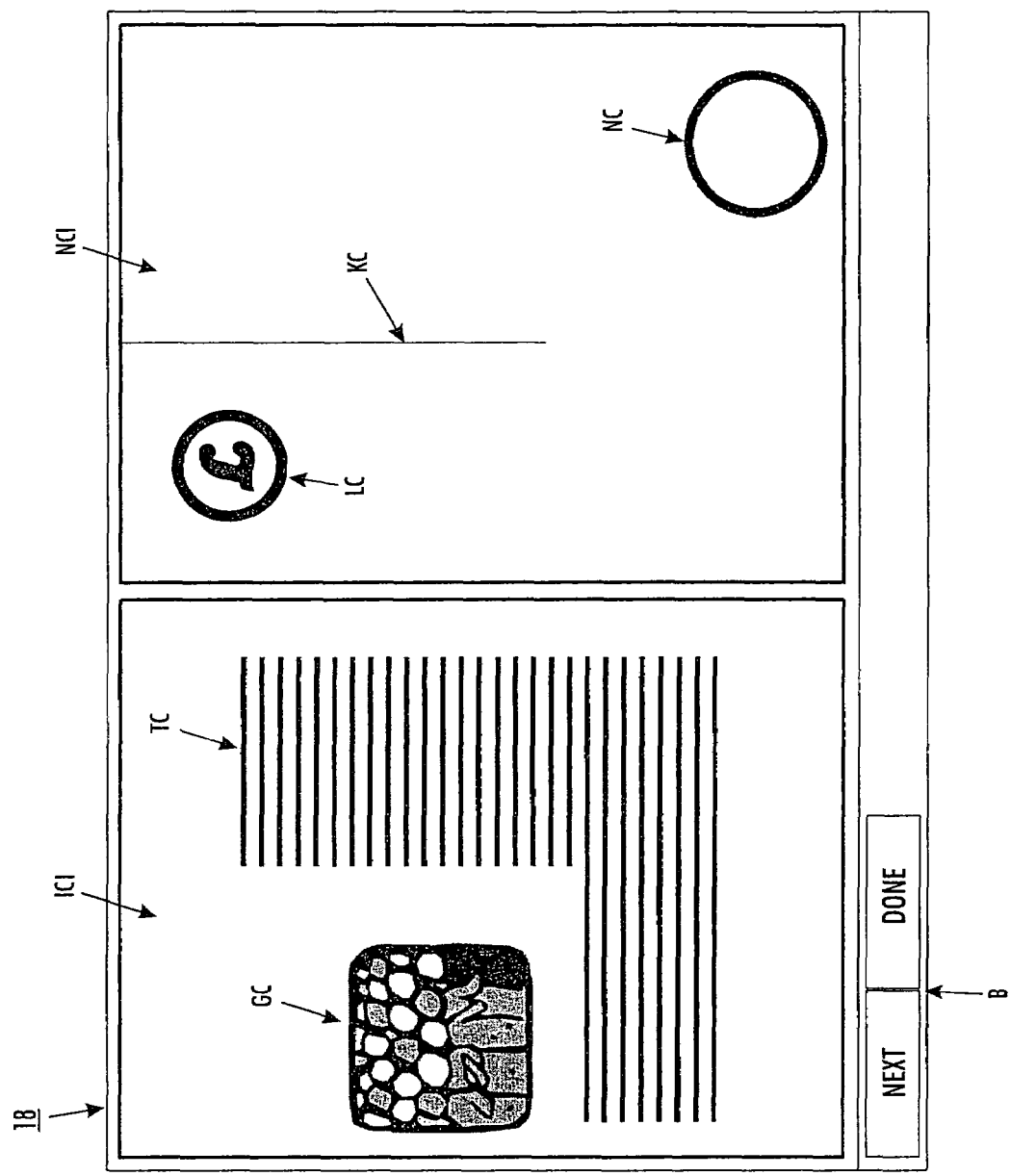
FIG. 5 is a diagrammatic illustration a graphical user interface (GUI) display in accordance with the present development and specifically related to the printed document page shown in FIG. 4.

FIGS. 4-7 provide a diagrammatic example of the above method. FIG. 4 shows an original printed page P of a document. The printed page comprises a scanner streak artifact K, textual information T, a coffee stain N, a photograph G, and a company logo L. This printed page P is scanned to derive original image data (step S1), and the original image data are segmented (step S2). The segmented components are classified (step S3) so that the information component image ICI and noise component image NCI are generated and displayed (step S4). FIG. 5 shows the output visual display device 18 including the results of step S4, i.e., the information component image ICI and noise component image NCI, display in the preferred side-by-side format. It can be seen that the segmentation operation S2 resulted in segmentation of at least the following elements: streak component KC, coffee stain component NC, corporate logo component LC, textual information component TC, and a photograph component GC. The component classification operation S3 classified the streak component KC, coffee stain component NC, corporate logo component LC as noise components NC and classified the textual information component TC, and a photograph component GC as information components IC, and the step S4 generated and displayed the images ICI,NCI accordingly as shown in FIG. 5. The corporate logo component LC has been classified erroneously as a noise component NC.

Figure 6:
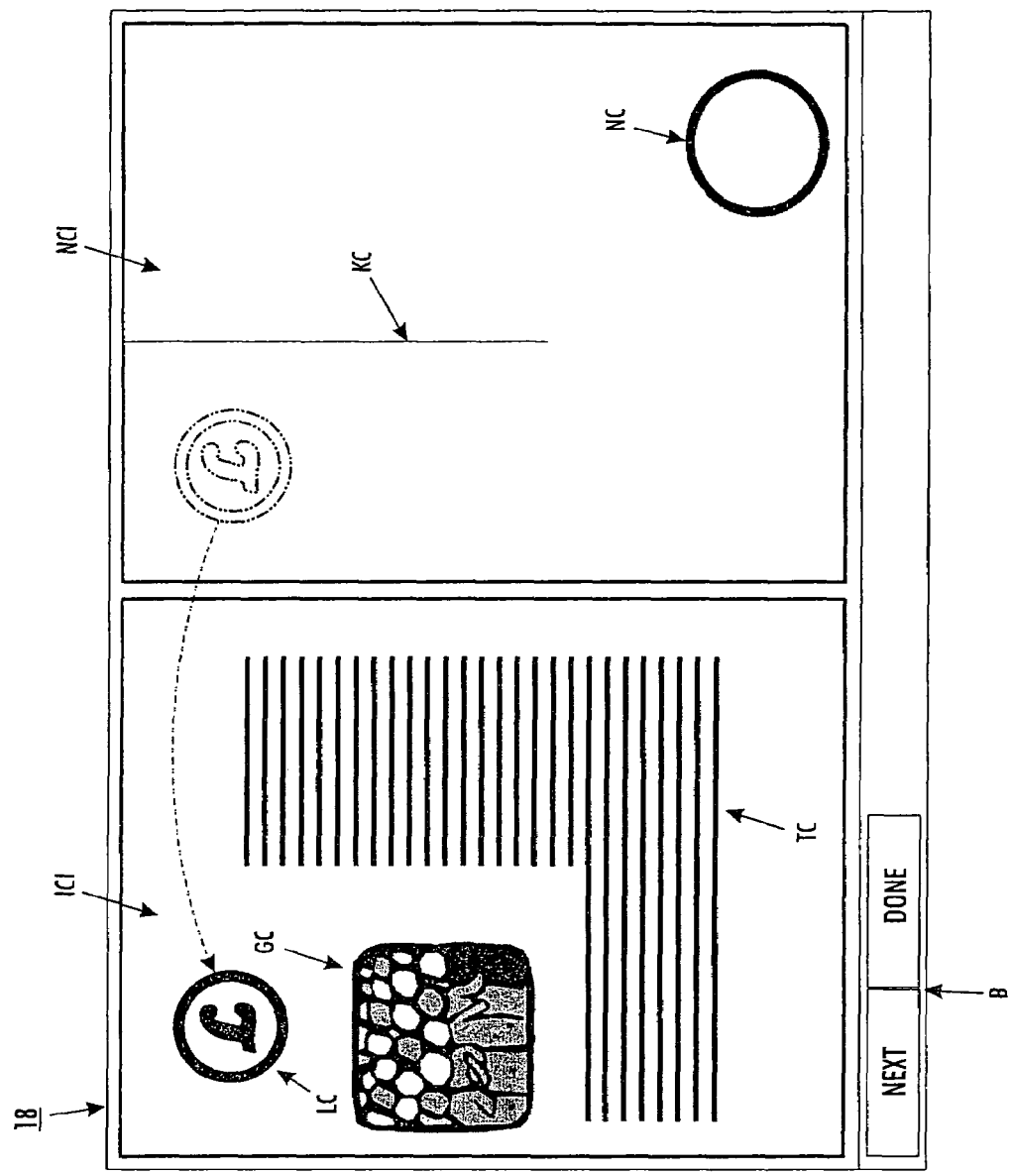
FIG. 6 shows the GUI of FIG. 5 in a revised state after receiving user input in accordance with the quality assurance method disclosed in FIG. 3; and, FIG. 7 shows an output digital image corresponding to the printed document page of FIG. 4 after processing in accordance with the present development.

Turning to FIG. 6, the quality assurance operation S5 is illustrated. The user has used a mouse, touch screen, or other input device 16 to select the erroneously classified corporate logo component LC, which causes the IPU 14 to reclassify the corporate logo component LC as an information component IC and update the images ICI,NCI to delete the corporate logo component LC from the noise component image NCI (as indicated by broken lines) and to insert the corporate logo component LC into the information component image ICI (as shown in solid lines) as described above with reference to FIG. 3.

Figure 7:
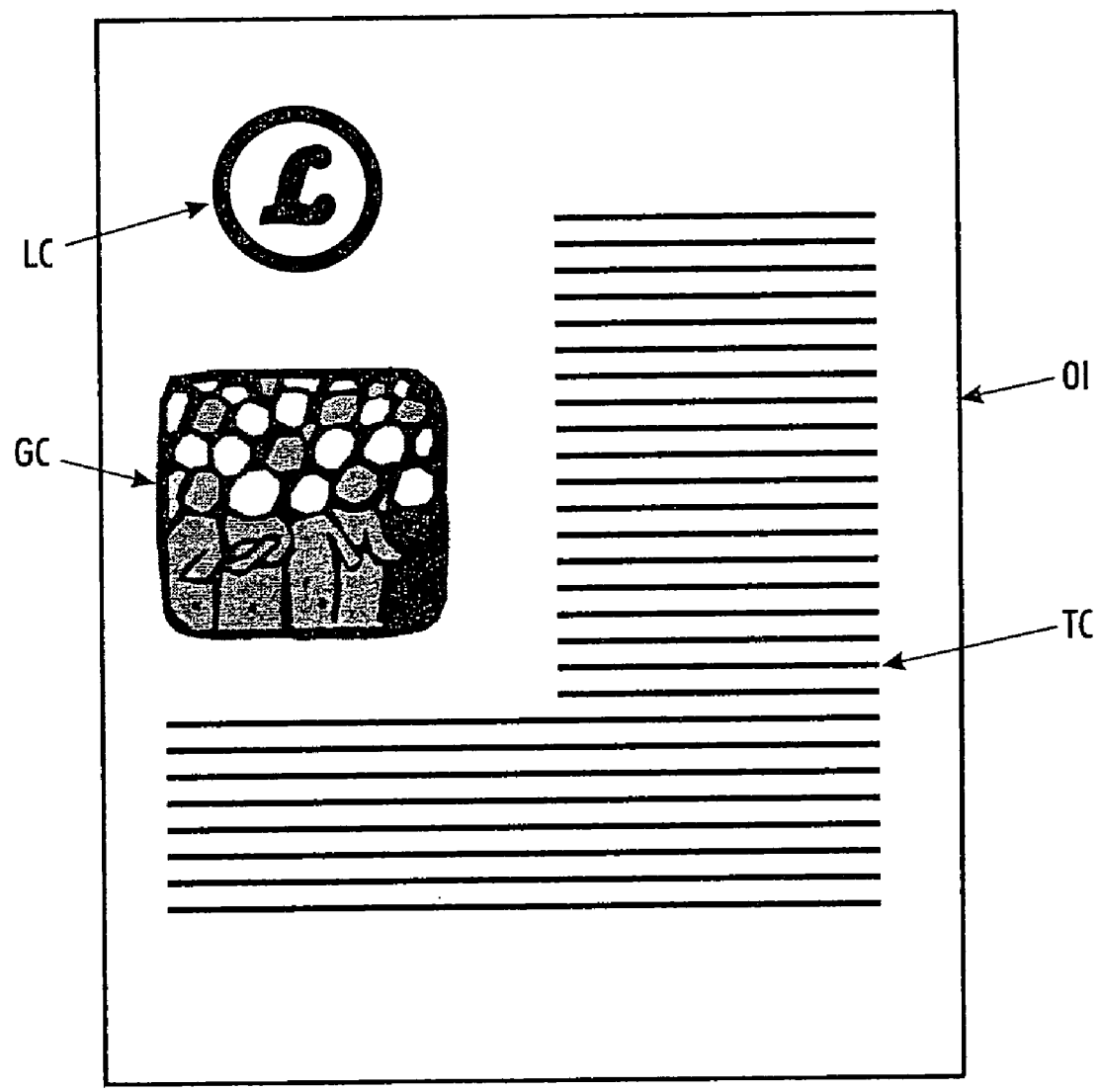

FIG. 7 shows an output digital image OI corresponding to the original printed document page of FIG. 4 after processing in accordance with the present development. The image 01, which can be displayed on the display 18, printed using the printer 20, and/or saved (together with the noise component image NCI) using the storage device 22, is defined by information components IC only, without any visible noise components NC. The output image OI comprises the textual information component TC, and the photograph component GC, and the corporate logo component LC that was correctly reclassified by the user during the quality assurance operation S5.

With reference again to FIG. 2, the present development optionally comprises a confidence feature S5 indicated in broken lines that allows for the selective bypass of steps S4 and S5. In this optional arrangement, the information components and noise components are each classified and assigned a confidence score by the step S3 to indicate the degree of certainty associated with the classification. If the confidence score for all components of any input image are sufficiently high, this indicates that the quality assurance step S5 can likely be bypassed for that page of image data. This provides the obvious advantages of increased speed and reduced cost. Also, because both the information and noise components IC,NC are saved in step S6, classification errors can be undone in a post-processing operation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An artifact removal and quality assurance method for digital images, said method comprising:
    scanning a document comprising a printed page;
    deriving input digital image data that define the page in terms of a plurality of input pixels;
    segmenting the input digital image data into a plurality of discrete components each defined by a group of one or more input pixels that are spatially grouped together and that relate to a common content type of the input digital image data;
    classifying each discrete component as either an information component or a noise component;
    generating and displaying to a user an information component image defined by said information components without any noise components;
    generating and displaying to the user a noise component image defined by said noise components without any information components, said noise component image displayed separate from but simultaneously with said information component image;
    receiving quality assurance input data from the user by which the user selects at least one improperly classified component based upon the user's visual inspection of the information component image and the noise component image;
    reclassifying the at least one improperly classified component selected by the user from an information component to a noise component or vice versa;
    regenerating and simultaneously but separately displaying the information component image and the noise component image based upon the quality assurance input data to account for the at least one reclassified component so that the at least one reclassified component is moved as a unit in real time as viewed by the user from an original location in the information component image to a corresponding location in the noise component image or vice versa;
    saving the regenerated information component image; and,
    saving the regenerated noise component image separate from but associated with the regenerated information component image.

2. The artifact removal and quality assurance method as set forth in claim 1, further comprising:
    using said quality assurance input data received from the user to adjust said step of classifying each discrete component as either an information component or a noise component for subsequent input digital image data defining additional printed pages of the document.

3. An artifact removal and quality assurance method for digital images, said method comprising:
    scanning a document comprising a printed page;
    deriving input digital image data that define the page in terms of a plurality of input pixels;
    segmenting the input digital image data into a plurality of discrete components each defined by a group of one or more input pixels that are spatially grouped together and that relate to a common content type of the input digital image data;

classifying each discrete component as either an information component or a noise component;

generating and displaying to a user an information component image defined by said information components;

generating and displaying to the user a noise component image defined by said noise components;

receiving quality assurance input data from the user that indicates zero or more improperly classified components based upon the user's visual inspection of the information component image and the noise component image;

if the quality assurance input data indicate at least one improperly classified component: (i) reclassifying the at least one improperly classified component selected by the user; and, (ii) regenerating and displaying the information component image and the noise component image based upon the quality assurance input data to account for the at least one reclassified component so that the at least one reclassified component is moved as a unit in real time as viewed by the user from an original location in one of the component images to a corresponding location in the other of the component images;

if said quality assurance input data received from the user indicates a misclassification of a component at least a select threshold number of times for different pages of the document, using said quality assurance input data received from the user to adjust said step of classifying each discrete component as either an information component or a noise component for subsequent input digital image data defining additional printed pages of the document.

4. The artifact removal and quality assurance method as set forth in claim 3, wherein the select threshold is set to three.

* * * * *